United States Patent [19]

Genno et al.

[11] Patent Number: 4,973,985

[45] Date of Patent: Nov. 27, 1990

[54] THERMAL RECORDER WITH INK SHEET TENSION

[75] Inventors: Hirokazu Genno, Hirakata; Hiroichi Yoneda, Tuzuki, all of Japan

[73] Assignee: Sanyo Electric Co., Ltd., Osaka, Japan

[21] Appl. No.: 321,970

[22] Filed: Mar. 10, 1989

[30] Foreign Application Priority Data

Mar. 17, 1988 [JP] Japan ................................ 63-64303

[51] Int. Cl.[5] ........................ G01D 15/10; B41J 2/325

[52] U.S. Cl. ........................... 316/76 PH; 346/139 R

[58] Field of Search .............. 346/76 PH, 139 R, 134, 346/136; 400/120

[56] References Cited

U.S. PATENT DOCUMENTS 4,755,833 7/1988 Tanigawa et al. ............ 346/76 PH

FOREIGN PATENT DOCUMENTS 6363446 2/1983 Japan .

*Primary Examiner*—Mark J. Reinhart

*Attorney, Agent, or Firm*—Darby & Darby

[57] ABSTRACT

A thermal transfer recording apparatus, such as a thermal transfer printer, which winds up at constant speed an ink sheet having ink to be transferred while applying a constant tension to the ink sheet by a DC motor through a speed reduction mechanism, so that the respective rotation speed and torques, when a wind-up roll is of a minimum diameter or a maximum diameter, are computed from the feed speed and tension of the ink sheet to thereby obtain a desired gradient in a chart of the relationship between the torque and the rotation speed of the DC motor, the gradient deciding a reduction ratio of the deceleration mechanism and the driving voltage of the DC motor being decided. Hence, even though the wind-up roll varies in an external form, variation in tension applied to the ink sheet and that in the feed speed can be restricted.

9 Claims, 9 Drawing Sheets

THERMAL RECORDER WITH INK SHEET TENSION

BACKGROUND OF THE INVENTION

1. Field of the Invention

The present invention relates to a thermal transfer recording apparatus and a driving method therefor, and more particularly to an improvement in a wind-up apparatus for an ink sheet and a method therefor.

2. Description of the Prior Art

A thermal transfer recording apparatus carrying out polychromatic recording, as disclosed in the Japanese Patent Application Laid-Open No. 58-140266, uses an ink sheet having a plurality of color ink and overlaps each color ink of the sheet onto a recording paper in order, thereby carrying out polychromatic recording.

The ink sheet loaded in this kind of thermal transfer recording apparatus and wound in a rolling manner is drawn out and transported to a transfer unit each time the ink sheet is transferred. In this case, when a slack or a wrinkle is created at the ink sheet while transporting, its transport system is hindered to cause the inconvenience, such as a color shift or an impossible transfer. Hence, in order to apply a proper back tension to the loaded ink sheet, a friction mechanism composed of a friction sheet is provided, the friction mechanism being detailed in the Japanese Patent Application Laid-Open No. 62-41070.

At the above-mentioned apparatus, a wind-up roll for winding the used ink sheet is driven through the same friction mechanism as in the ink sheet feed roll, thereby generating a proper winding force to wind up the ink sheet. The friction mechanism generates a slip to obtain the winding speed meeting the printing transfer speed regardless of a winding diameter varying with the amount of the wound-up ink sheet.

Meanwhile, as disclosed in the Japanese Utility Model Publication No. 03-446, an ink sheet feed device of a printer has been proposed which connects DC motors to a pair of rotary members fixed to both lengthwise ends of the ink sheet so that rotations of both the rotary members are so controlled that the ink sheet delivered from one rotary member is wound up on the other.

The apparatus using the friction mechanism for drawing out and winding up the ink sheet, cannot eliminate particular variation caused by the friction mechanism in the drawing-up tension (back tension) and wind-up tension, and also environmental conditions and abrasion may cause variation in the tension of the ink sheet, which makes a poor transfer caused by wrinkle and an improper transport of the ink sheet.

The apparatus using a pair of DC motors to feed the ink sheet electrically controls the DC motors only by two members of rotations, thereby, creating such problems that the feed speed for the ink sheet varies following variation in a diameter of an ink sheet roll and that the tension applied thereto varies.

SUMMARY OF THE INVENTION

In order to solve the above problem, the present invention has been designed. A first object thereof is to provide a thermal transfer recording apparatus which uses a wind-up roll to which a DC motor applied with a predetermined voltage is connected through speed reduction means having a predetermined reduction ratio to thereby wind up an ink sheet, so that the ink sheet can be transported at constant tension and feed speed while transferring regardless of a roll diameter of the wind-up roll, whereby the ink sheet is prevented from creating wrinkles and a proper transfer can be obtained.

A second object of the invention is to provide a thermal transfer recording apparatus which, when the ink sheet is wound up without being transferred, makes voltage applied to the DC motor higher than that when transferred, thereby enabling the ink sheet to be wound up at faster speed than that at transferring ink.

A third object of the invention is to provide a thermal transfer recording apparatus which drives an ink sheet roll for feeding the ink sheet, through speed reduction means with a predetermined reduction ratio, thereby enabling the ink sheet to be wound up by both the ink sheet roll and the wind-up roll.

The above and further objects and features of the invention will more fully be apparent from the following detailed description with accompanying drawings.

DESCRIPTION OF THE PREFERRED EMBODIMENTS

Next, the embodiments of the invention will be described with reference to the drawings.

Figure 1:
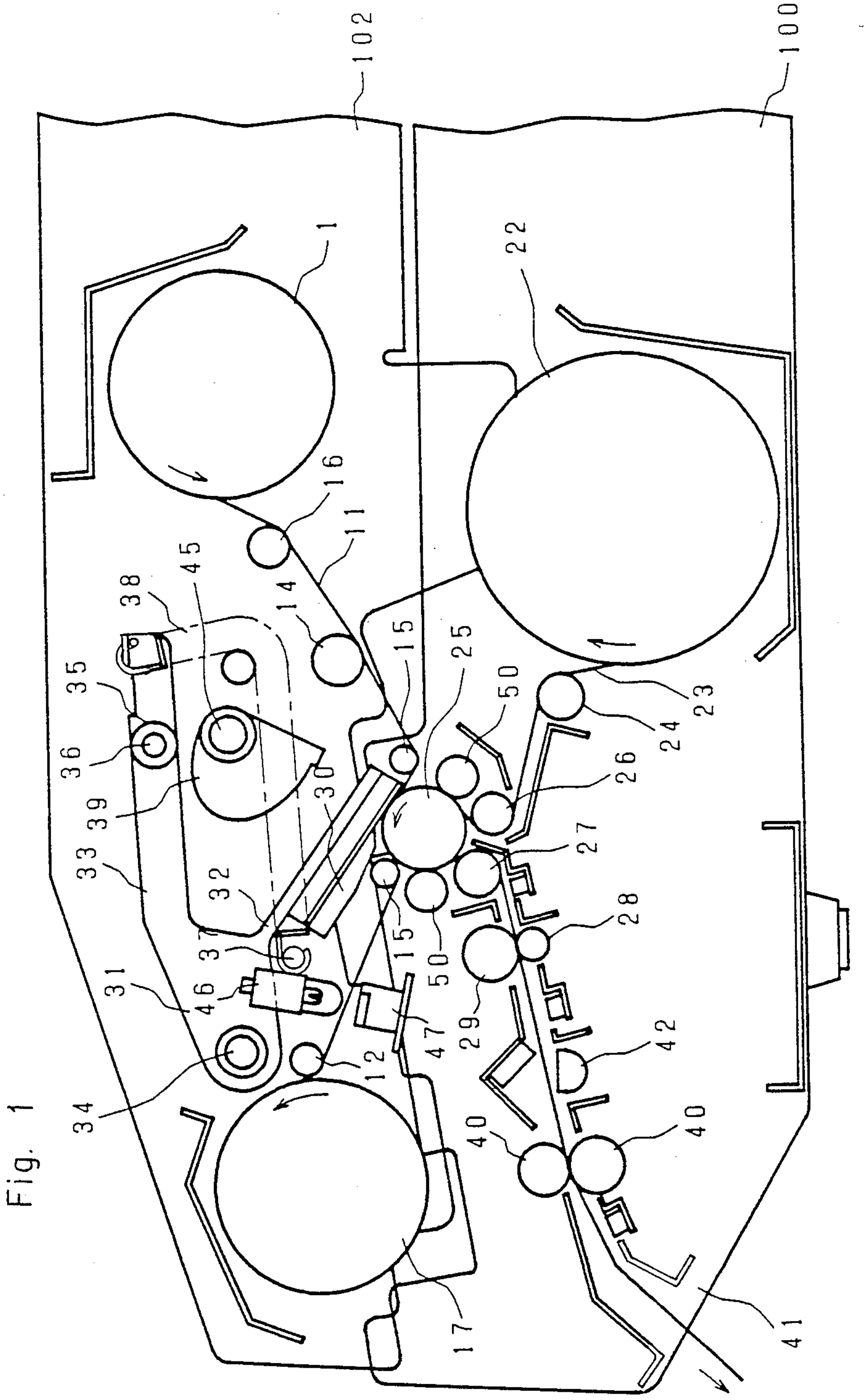
FIG. 1 is a typical sectional side view of a first embodiment of a thermal transfer recording apparatus of the invention.

FIG. 1 is a sectional side view of a color thermal transfer recording apparatus to which the present invention is applied.

An ink sheet 11 drawn out of an ink sheet roll 1 has color ink of such as yellow, magenta and cyanogen longitudinally arranged in the repeated order, is guided by a sheet transporting roller 14 and a first head guide shaft **15*a* via a guide shaft 16 to pass between a thermal head 30 and a rotatable platen roller 26 opposite thereto, and reaches a wind-up roll 17 from a second head guide shaft 15*b* through a guide shaft 12**.

On the other hand, a recording paper 23 drawn out from a recording paper roll 22 mounted between a pair of holding reels is transported through a guide shaft 24 and a paper guide shaft 26, passes between the platen roller 26 and a thermal head 30 opposite thereto, and thereafter reaches a discharge port 41 through a paper guide shaft 27, a paper discharge shaft 28, a paper discharge roller 20, and between a pair of discharge rollers 40 opposite to each other. At both sides of the platen roller 26 and just before and after the thermal head 30, press-contact rollers 50 are provided movable toward and away from the platen roller 26, thereby holding the recording paper 23 when transported, without sliding on the platen roller 25. Also, the recording paper 23 after recorded is cut by a cutter 42 and discharged from the discharge port 41, the thermal head 30 being disposed on a pair of plate-like brackets 31 and being movable toward and away from the platen roller 25. The plate-like brackets 31, generally V-shaped, are composed of a first branch 32 and a second branch 33, and a coupling portion of the branches 32 and 33 is pivoted movable through a shaft 34. At the first branch 32 are disposed the thermal head 30, the first head guide shaft 15*a* and the second head guide shaft 15*b* in parallel to each other, at the second branch 33 is disposed a cam press-contact shaft 30 having a cam press-contact roller 35. The plate-like bracket 31 is rotatably biased clockwise around the shaft 34 by means of a spring 38 stretched between the utmost end of the second branch 33 and a shaft 37.

A cam support shaft 46 having a fan-shaped eccentric cam 39 is disposed below the cam press-contact shaft 36 and in parallel thereto, the cam press-contact roller 35 facing to the eccentric cam 39.

Figure 2:
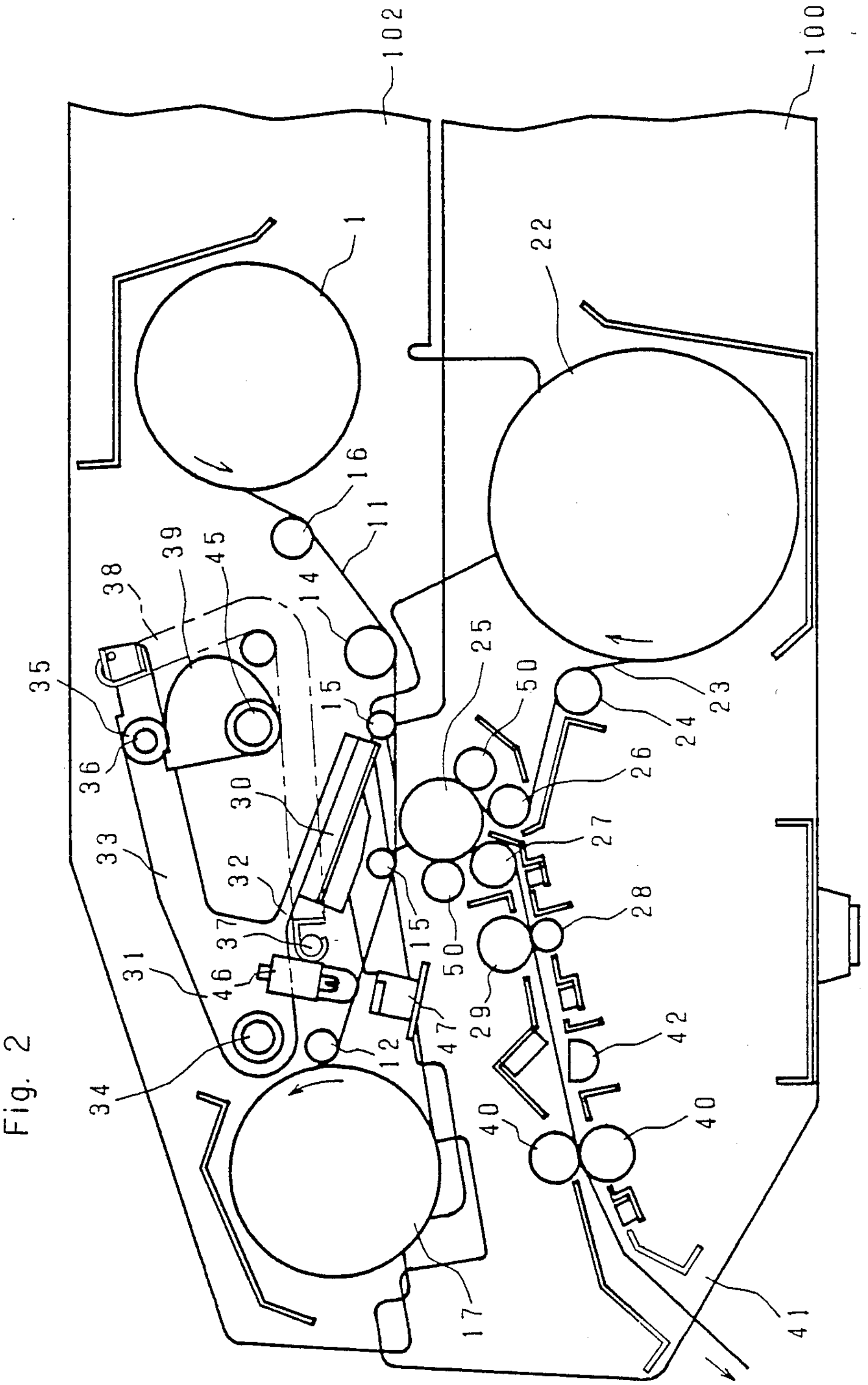
FIG. 2 is a typical sectional side view of the thermal transfer recording apparatus in FIG. 1, showing the state where an ink sheet is transported without being transferred.

As shown in FIG. 2, the cam support shaft 45 is properly rotated by a driving motor (not shown) so as to allow the thermal head 30 to movable toward and away from the platen 25. In other words, when the eccentric cam 39 is positioned below the shaft 45, the plate-like bracket 31 is rotatably biased by the spring 38 clockwise around the shaft 34, thereby bringing the thermal head 30 into press-contact with the platen 25. On the other hand, the eccentric cam 39, when positioned above the cam support shaft 45, pushes up the press-contact shaft 36, so that the plate-like bracket 31 rotates counter-clockwise around the shaft 34 against a biasing force of the spring 38, thereby moving the thermal head 30 away from the platen 25.

On the way of the transportation route of the ink sheet 11, a light source 46 and a color sensor 47 opposite thereto are disposed in a manner of putting therebetween the ink sheet 11, thereby detecting color of ink sheet 11.

The above components are mounted on a pair of fixed side plates 100 and a pair of movable side plates 102 disposed somewhat inside the fixed side plates 100, in parallel thereto, rotatably around a shaft 101.

Between the pair of fixed side plates 100 are mounted the recording paper roll 22, guide shaft 24, paper guide shafts 26 and 27, platen roller 25, press-contact rollers 50, paper discharge shaft 28, paper discharge roller 29, cutter 42 and discharge rollers 40.

Figure 3:
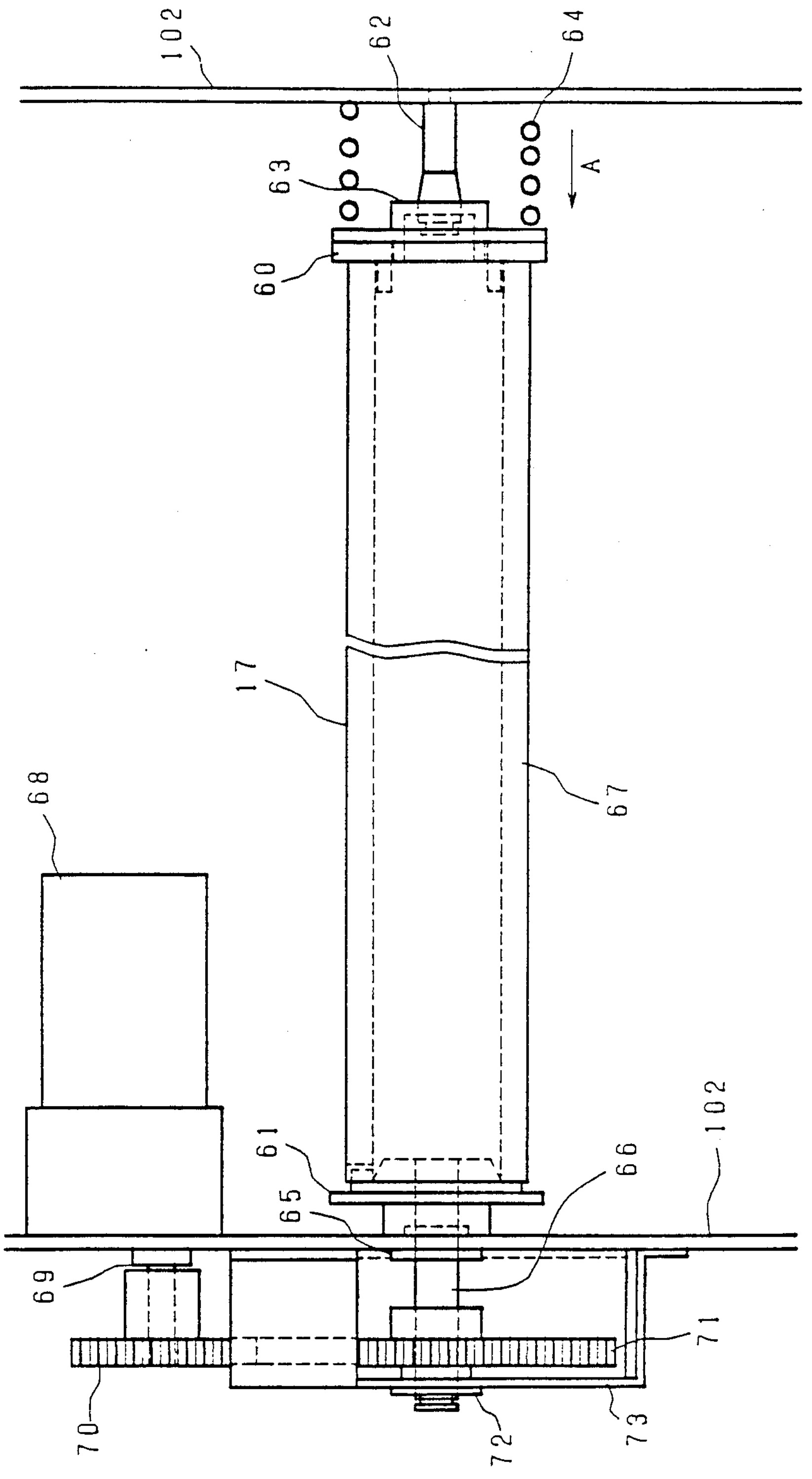
FIG. 3 is a structural plan view of a wind-up roll.
Figure 4:
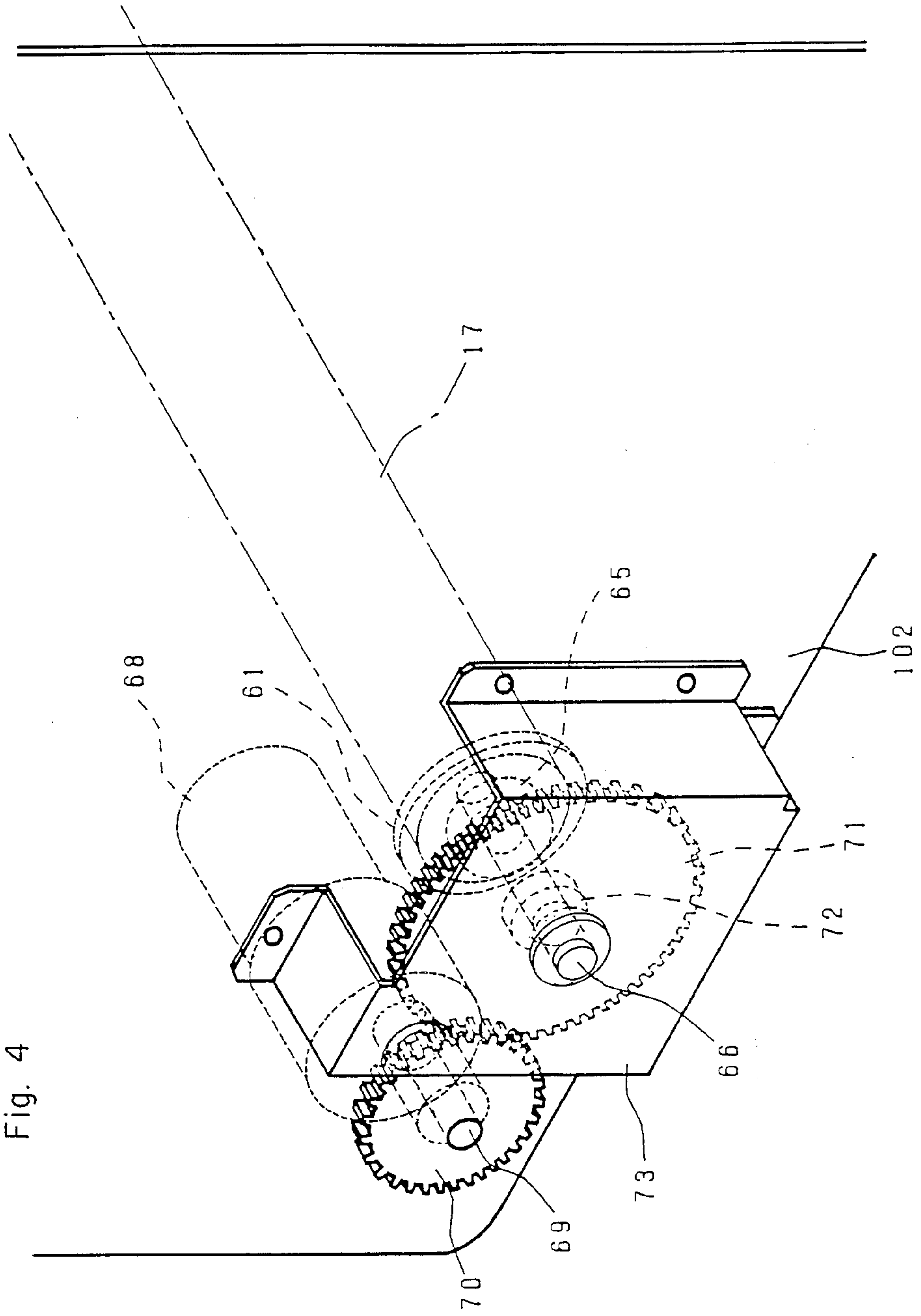
FIG. 4 is a perspective enlarged view of a drive portion of the wind-up roll.

Between the pair of movable side plates 102 are mounted the ink sheet roll 1, guide shaft 12, sheet transport roller 11, thermal head 30 and peripheral units thereof, wind-up roll 17 and the like. FIG. 3 is a plan view thereof and FIG. 4 is a perspective enlarged view in part of the same, which show the wind-up roll for winding up the ink sheet, which is the principal portion of the invention.

One holding reel 60 of the wind-up roll 17 is freely fitted to a set reel 63 mounted to a shaft 62 provided at the movable side plate 102 and biased by a coil spring 64 in the direction of the arrow A in the drawing. The other holding reel 61 of the wind-up roll 17 is fixed by a pin or the like to a shaft 66 rotatably pivoted to the movable side plate 102 through a bearing 65. Between the holding reels 60 and 61 is supported a roll body 67 of the wind-up roll 17 by a biasing force of the coil spring 64. A DC motor 68 for rotatably driving the wind-up roll 17 is fixed to the movable side plate 102 by screw bolts (not shown). A reduction gear 70 provided onto a rotary shaft 69 of the DC motor 68 engages with a gear 71 provided on the shaft 66, the gears 70 and 71 constituting speed reduction means, the reduction ratio thereof being set in accordance with the condition to be discussed below.

The shaft 66 is rotatably supported at on end thereof to a bearing 72 provided at a gear box 73 mounted on the movable side plate 102.

Figure 5:
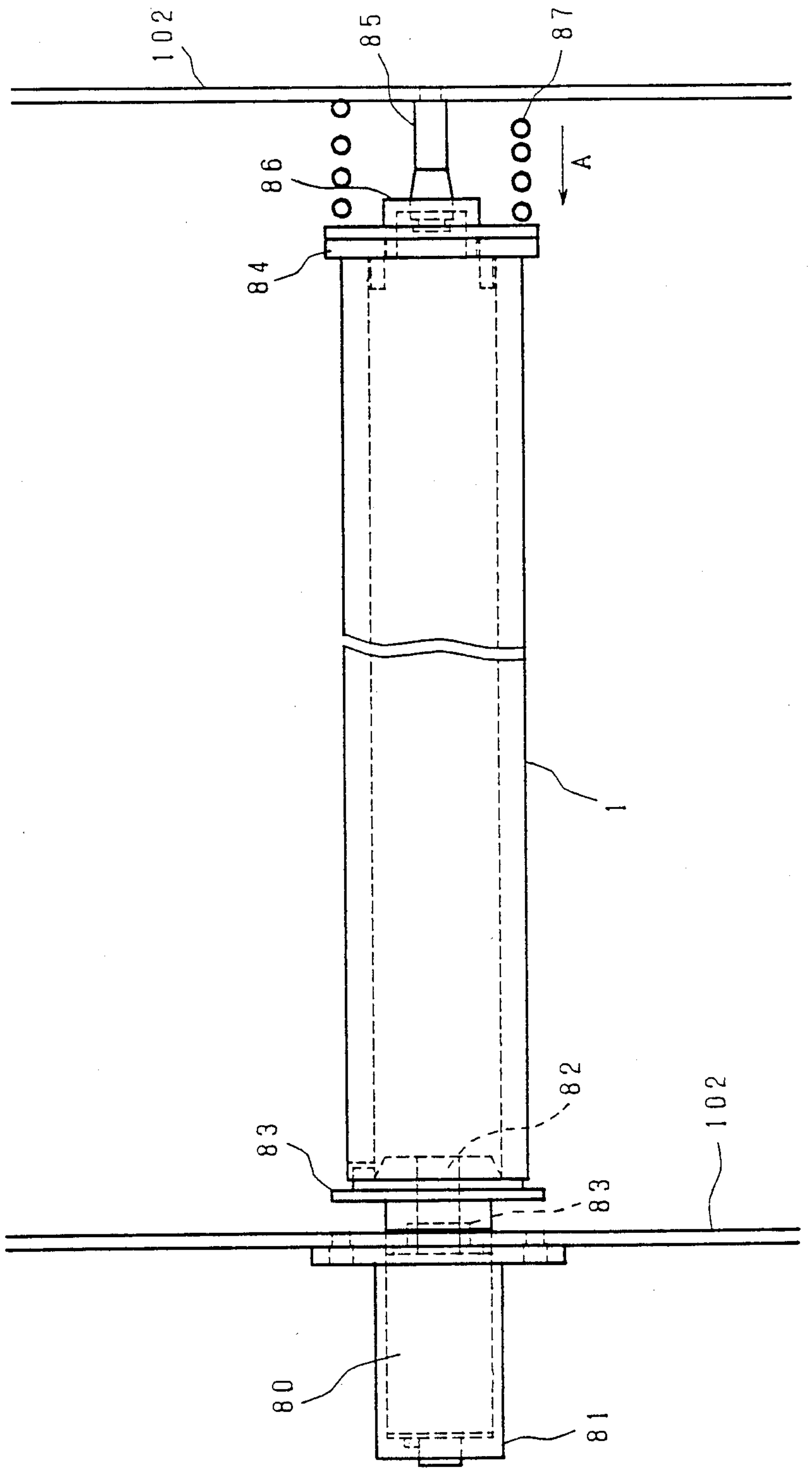
FIG. 5 is a structural plan view of an ink sheet roll.
Figure 6:
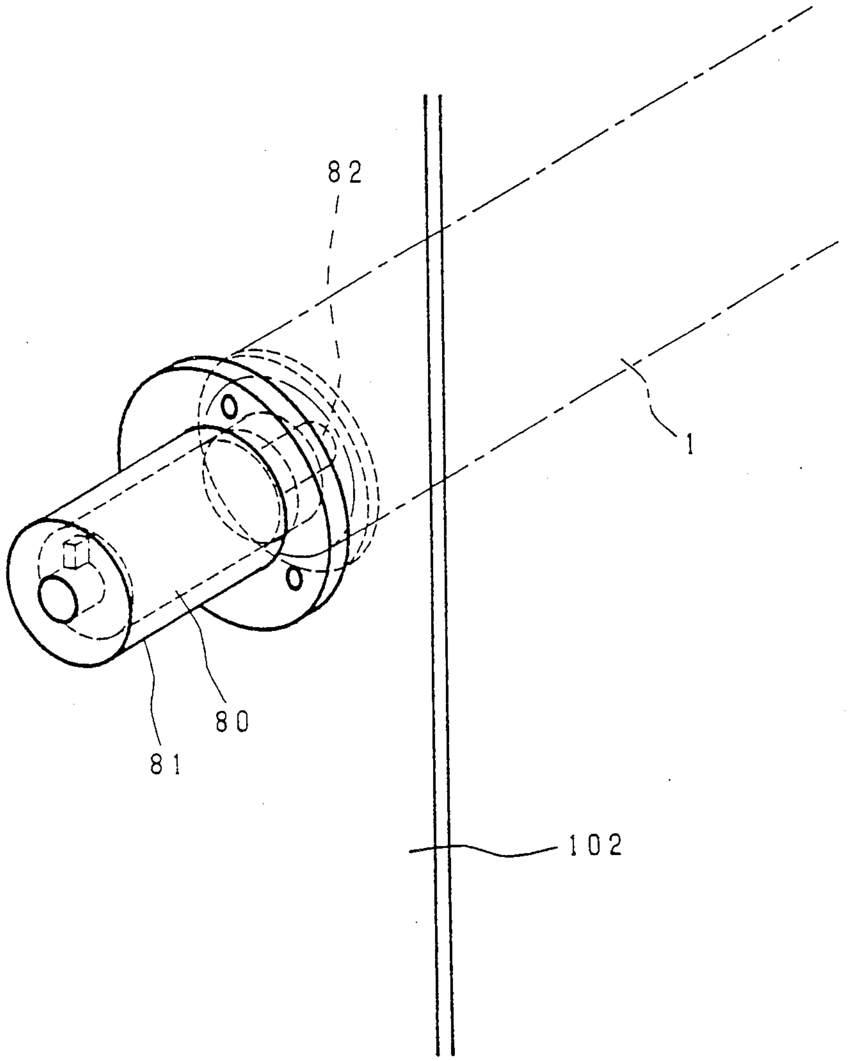
FIG. 6 is a perspective enlarged view in part of the ink sheet roll.

FIG. 5 is a plan view and FIG. 6 is a perspective enlarged view in part of the principal portion of the ink sheet roll used in the present invention.

In FIGS. 5 and 6, a torque limiter 80 is used as means for applying tension to the ink sheet when the sheet is drawn out, the torque limiter 80 using an Ogura powder limiter OPL1 with limit torque of 1 Kg·cm manufactured by Ogura Clutch Co., Ltd.

A cover 81 for the torque limiter 80 is integral with a cylindrical portion of the torque limiter 80 and fixed to the movable side plate 102 by screw bolts (not shown). A shaft 82 of the torque limiter 80 is rotatably supported to the movable side plate 102 through a bearing 88 and fixedly supports one holding reel 83 for the ink sheet roll 1.

The other holding reel 84 therefor is freely fitted to a set reel 86 provided at a shaft 85 mounted on the movable side plate 102 and biased by a coil spring 87 in the direction of the arrow A in FIG. 5.

The ink sheet roll 1 is supported between the pair of holding reels 83 and 84 by a biasing force of the coil spring 87.

In order to generate only by the torque limiter 80 tension to be applied stably to the ink sheet 11 when the sheet is drawn out, the friction force between the set reel 86 and the holding reel 84 is required to be reduced as much as possible. Therefore, a sliding sheet of, for example, the trade name "RURON J" is preferable to be stuck. When the drawing-out tension for the ink sheet roll 1 thus supported is measured, it is about 400 g for the maximum diameter (66 mm) of the ink sheet roll 1 and about 700 g for the minimum diameter (33 mm) of the same, and variation in tension during one rotation has been about zero.

Next, explanation will be given on a wind-up unit for the ink sheet. In the embodiment, the DC motor 68 connected to the wind-up roll 17 through gears 70 and 71 uses DME33G2 of rating of 24V by Nippon Servo Co., Ltd. and a reduction gear of 1/61 is attached to the motor 68 itself.

Figure 7:
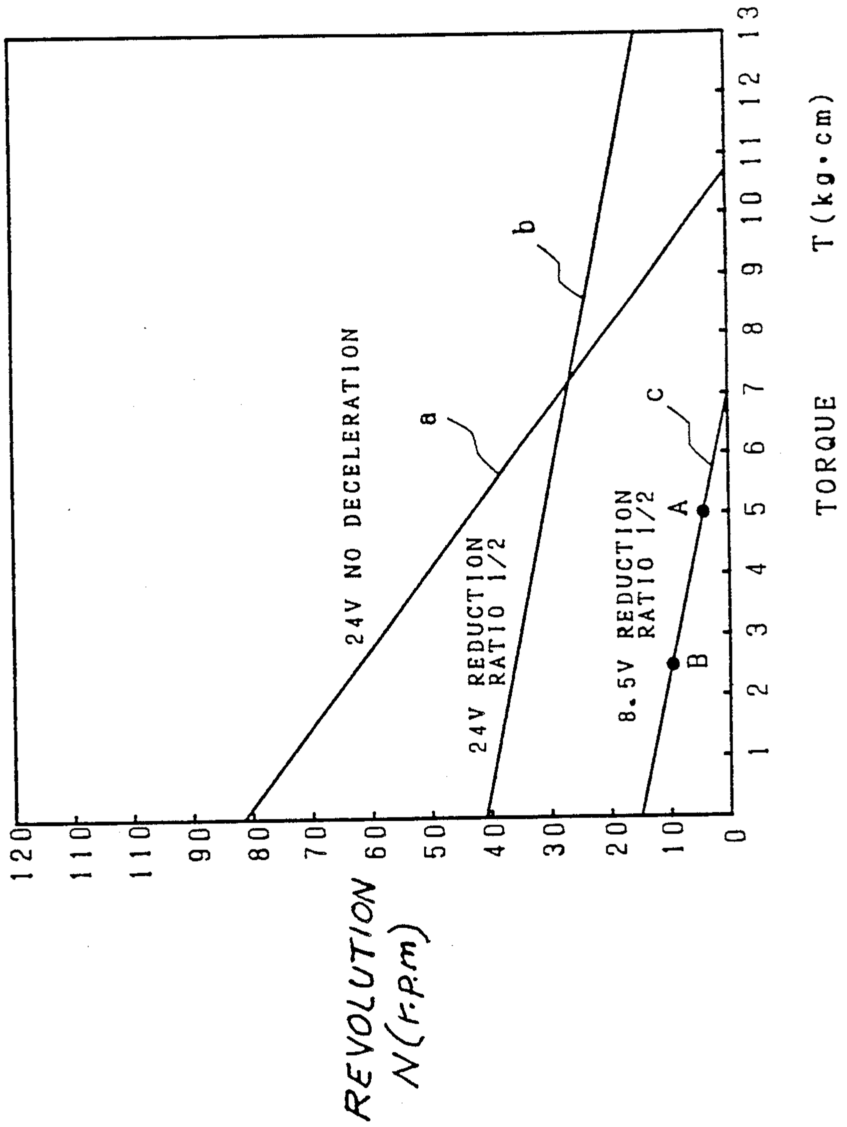
FIG. 7 is a chart of torque and rotation of a DC motor.

FIG. 7 is a chart showing the torque-number of rotations (T-N) of the DC motor. When the DC motor 68 is directly used without newly reducing the speed, a T-N characteristic shown in line a in FIG. 7 is obtained.

The wind-up tension for the ink sheet required at transferring ink is different in the ink sheet in use, which is about 1.5 Kg in this embodiment and, when converted in a torque, is 4.95 Kg/cm for a maximum diameter (66 mm) and 2.48 Kg/cm for a minimum diameter (33 mm) of the wind-up roll 17.

Now, assuming that the transfer speed is about 5 msec per one line at resolution of 12 dot/mm, it becomes 60 msec/mm, whereby 1.67 cm/sec = 100 cm/min is obtained. Accordingly, the number of rotations of wind-up roll 17 requires $100/6.6\pi = 4.82$ (rpm) for the maximum diameter (66 mm) and 100/3.3π=9.65 (rpm) for the minimum diameter (33 mm).

Hence, a torque T and the number of rotations N for the wind-up roll 17 required when transferred are given as follows:

When T=4.95 (Kg·cm), N=4.82 (rpm) and

When T=2.48 (Kg·cm), N=9.65 (rpm), which correspond to the points A and B in FIG. 7.

In FIG. 7, when the line connecting the points A and B is conformed with the T-N characteristic of DC motor 68, it is possible to directly wind up the ink sheet by the DC motor 68. When an output of the DC motor 08 is properly decelerated, the gradient of T-N characteristic is changeable. In other words, when the motor 68 is decelerated to ½ keeping rated voltage of 24V, the T-N characteristic as shown in b is obtained, thereby obtaining the T-N characteristic of the same gradient as the line connecting the points A and B in FIG. 7.

When voltage is set to 8.5V, the T-N characteristic as shown in line c in FIG. 7 is obtained, the T-N characteristic coinciding with the line connecting the points A and B.

Accordingly, it is preferable to set a reduction ratio to be ½ of the gears 70 and 71 interposed between the DC motor 68 and the wind-up roll 17.

When ink is transferred, the applied voltage to the DC motor 68 is set to 8.5V, so that the required torque and number of rotations corresponding to dimension of diameter of wind-up roll 17 are obtainable, thereby enabling the ink sheet to be wound up while being applied with a predetermined winding tension.

In a case where only the ink sheet is required to be transported without being transferred such as during the initial setting, the thermal head 30 is moved away from the platen roller 25 and the applied voltage to the DC motor 68 is set to the rated voltage of 24V, thereby enabling the ink sheet to be wound up at far faster speed than that when the ink is transferred.

Figure 8:
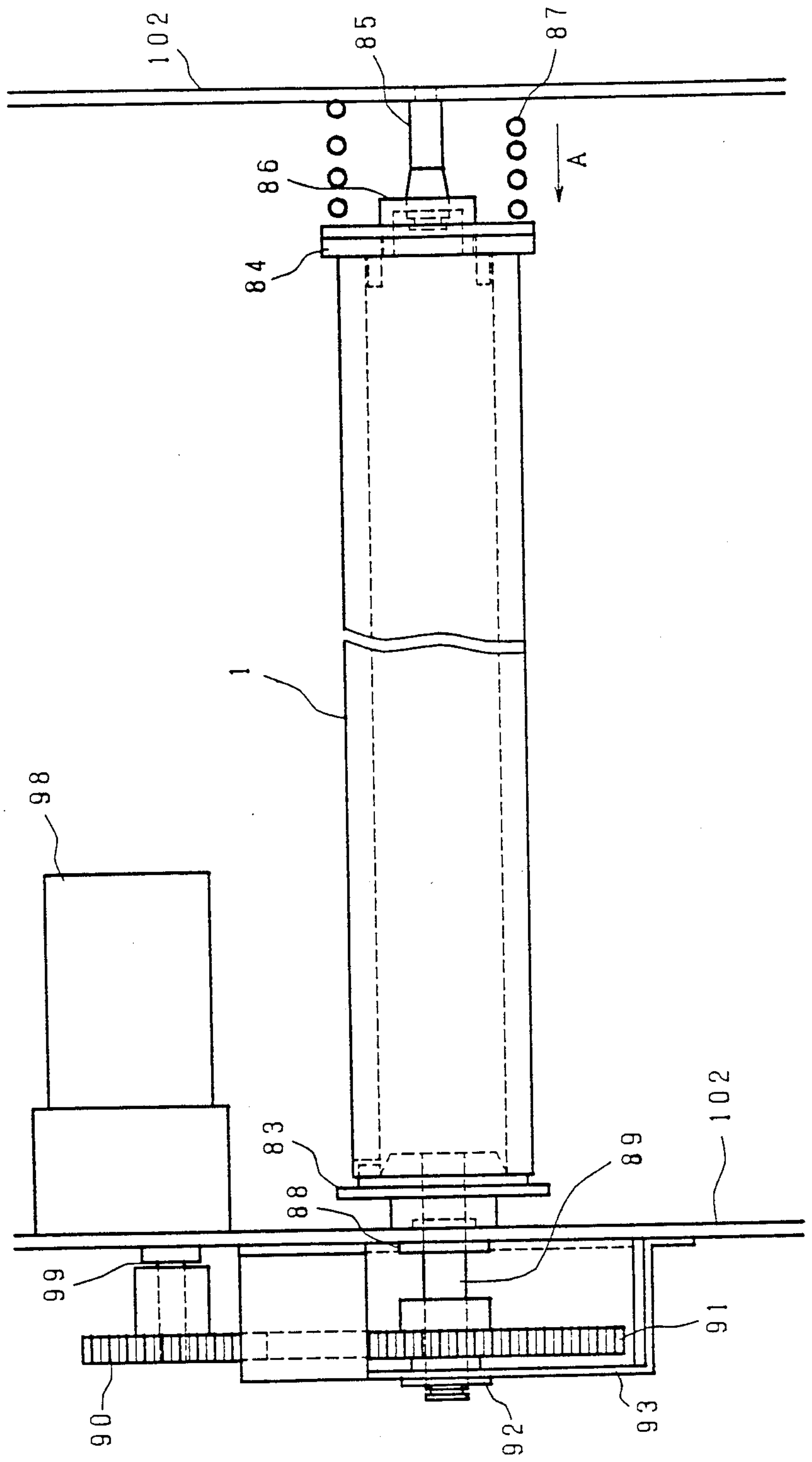
FIG. 8 is a structural plan view of a second embodiment of the invention, showing an ink sheet roll thereof.
Figure 9:
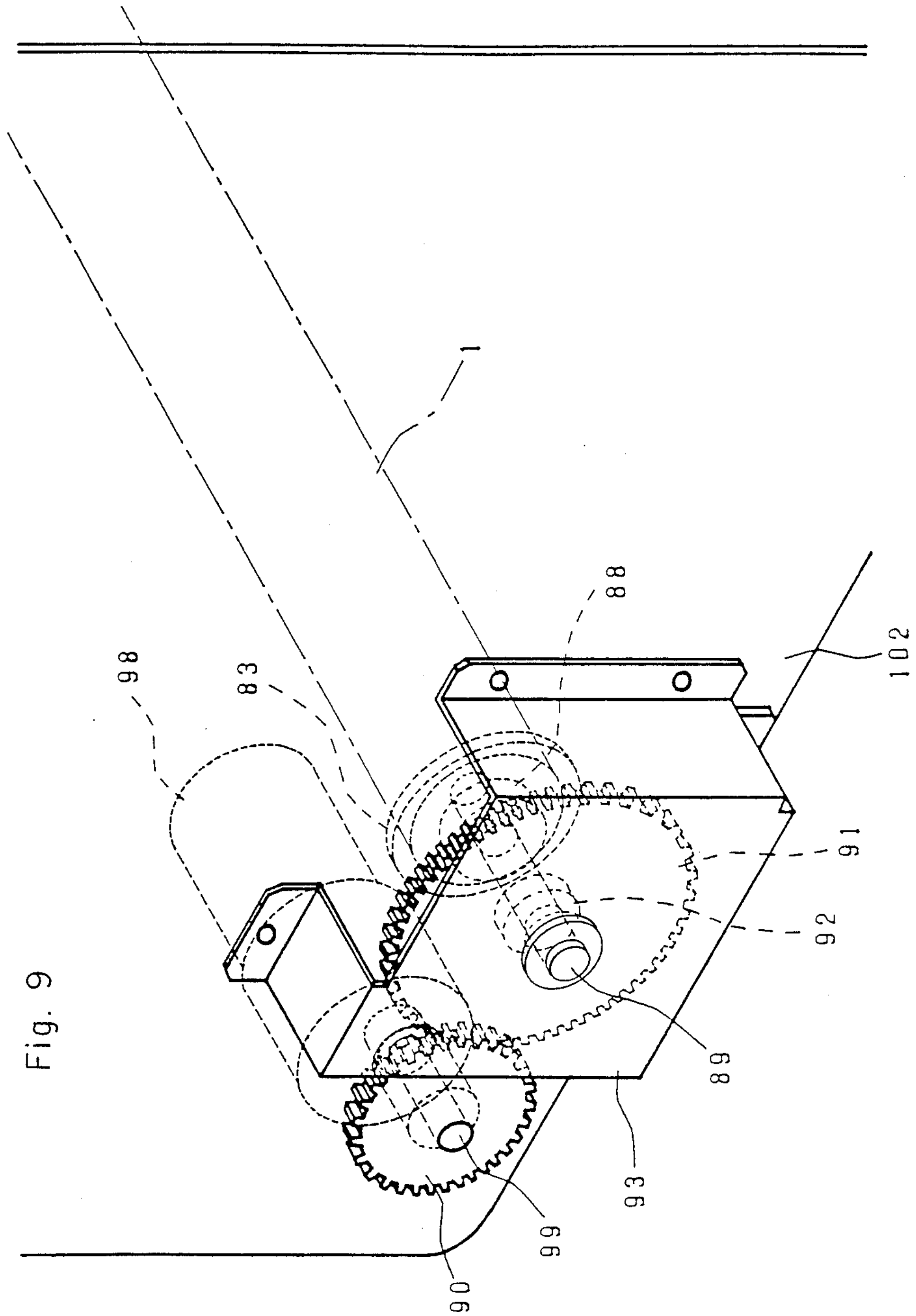
FIG. 9 is a perspective enlarged view in part of the ink sheet roll in the second embodiment.

Next, explanation will be given on a second embodiment of the thermal transfer recording apparatus of the invention. FIG. 8 is a structural plan view of an ink sheet roller in the second embodiment of the invention, and FIG. 9 is a perspective enlarged view in part thereof.

The first embodiment as described above uses the torque limiter 80 as the tension applying means to the ink sheet 11, and the second embodiment makes it possible to drive the ink sheet roll 1 by a DC motor of the same characteristic as the wind-up roll 17, thereby applying tension to the ink sheet 11 through a static torque when a power source is cut off.

One holding reel 84 of the ink sheet roll 1 is freely fitted onto a set reel 86 provided at a shaft 85 mounted on the movable side plate 102 and biased by a coil spring 87 in the direction of the arrow A in FIG. 8. The other holding reel 83 of the ink sheet roll 1 is fixed by a pin or the like to a shaft 89 rotatably pivoted to the movable side plate 102 through a bearing 88, the ink sheet 1 being supported between the holding reels 83 and 84 by a biasing force of the coil spring 87 A second DC motor 98 for rotatably driving the ink sheet roll 1 is fixed to the movable side plate 102 by screw bolts (not shown). A reduction gear 90 provided at a rotary shaft 99 of the second DC motor 98 engages with a gear 91 provided at the shaft 89, the gears 90 and 91 constituting second speed reduction means and its reduction ratio is set in accordance with the aforesaid condition.

The shaft 89 is rotatably supported at one end thereof by a bearing 92 provided at a gear box 93 mounted to the movable side plate 102.

When the ink sheet 11 is drawn out, the second DC motor 98 is cut off from the power source. The static torque generated in the state where the second DC motor 98 is cut off from the power source, applies to the ink sheet the winding tension. When the DC motors 68 and 98 are connected to the wind-up roll 17 and ink sheet roll 1 respectively, the DC motors 68 and 98 are reversely rotated for reversely transporting the ink sheet to be transferred. At this time, the second DC motor 98 directly connected to the ink sheet roll 1 is applied with voltage and the DC motor 68 at the wind-up roll 17 side is cut off from the power source, so that tension is applied to the ink sheet 11.

For example, when each color region is on the ink sheet 11 of A3-size and recorded on a recording paper of A4-size so as to create non-transferred region on the ink sheet 11, or when the ink sheet 11 has a black region separate from the Y, M and C color regions, the transfer by the reverse rotation can record by use of the non-transferred region or black region on the ink sheet 11 the various informations, such as a header and a footer, on a non-recorded portion of the recording paper 23 which has been impossible to be recorded. In other words, in a case where the recording paper 23 is recorded in the normal rotation direction of the arrow A in FIG. 1, if the recording paper 23 comes off from the press-contact roller 50, which is likely to cause misregistration of color, whereby the recording paper 23 cannot be recorded between the thermal head 30 and the press-contact roller 50 just thereafter. However, when the non-recorded portion is recorded in monochrome at transferring by the reverse rotation, the recording only by monochrome has no problem in misregistration of color, thereby enabling monochromic recording of header or footer information, such as title or date on the recording paper 23.

Also, during the initial setting or the like, when the ink sheet is once normally transported and thereafter rewound, the first and second DC motors 68 and 98 are applied with voltage to be driven, respectively. Both the motors 68 and 98 can be driven to wind the ink sheet at faster speed than that when ink is transferred, and can be driven at higher voltage than that when ink is transferred so as to wind the same at much higher speed.

As seen from the above, in the present invention by connecting the DC motor to the wind-up roll to directly wind up thereto the ink sheet, whereby obtaining the torque and number of rotations corresponding to the diameter of winding roll when transferred, which result in regular optimum winding tension. Hence, the ink sheet is prevented from creating wrinkles and proper transfer is obtainable. Also, the torque limiter or the static torque by the DC motor is used as the tension applying means for the ink sheet roll, whereby the stable winding tension is obtainable for a long time regardless of the service environmental conditions.

Furthermore, the DC motor is decelerated at the predetermined reduction ratio and driving voltage is controlled, whereby the constant wind-up tension and feed speed are obtainable regardless of the winding diameter of the wind-up roller.

Also, when the ink sheet is transported, voltage applied to the DC motor is made higher than that when ink is transferred, thereby enabling the ink sheet to be wound up at far faster speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A thermal transfer recording apparatus which is provided with a base, a platen roller rotatably driven, and a thermal head movable toward and away from and opposite to said platen roller so that between said platen roller and said thermal head in press-contact therewith are inserted an ink sheet and a recording paper superposed with each other, said platen roller being rotatably driven while transferring ink of said ink sheet on said recording paper, said thermal transfer recording apparatus comprising:

a feed roll disposed at the one side of the rotating direction of said platen roller for feeding said ink sheet;

a wind-up roll disposed at the other side of said platen roller for winding up said ink sheet;

a first DC motor connected to said wind-up roll so as to rotatably drive said wind-up roll;

motor driving means for applying a predetermined voltage to said first DC motor when said ink is transferred; and tension applying means provided at said feed roll for applying a predetermined tension to said ink sheet when said ink sheet is fed, said wind-up roll and first DC motor being connected to each other through first speed reduction means with a predetermined reduction ratio, said reduction ratio depending on a gradient which is decided based on a relationship between a torque and a rotational speed of said first DC motor by the respective rotation speed and torques computed from the feed speed and tension of said ink sheet when said wind-up roller has a maximum diameter, which is constituted by the wind-up roll being fully wound with the ink sheet while the feed roll is free of being wound with the ink sheet, and when said wind-up roll has a minimum diameter, which is constituted by said wind-up roll being free of being wound by the ink sheet while the feed roll is fully wound with the ink sheet.

2. A thermal transfer recording apparatus which is provided with a base, a platen roller rotatably driven, and a thermal head movable toward and away from and opposite to said platen roller so that between said platen roller and said thermal head in press-contact therewith are inserted an ink sheet and a recording paper superposed with each other, said platen roller being rotatably driven while transferring ink of said ink sheet on said recording paper, said thermal transfer recording apparatus comprising:

a feed roll disposed at the one side of the rotating direction of said platen roller for feeding said ink sheet;

a wind-up roll disposed at the other side of said platen roller for winding up said ink sheet;

a first DC motor connected to said wind-up roll so as to rotatably drive said wind-up roll;

motor driving means for applying a predetermined voltage to said first DC motor when said ink is transferred; and tension applying means provided at said feed roll, for applying a redetermined tension to said ink sheet when said ink sheet is fed, said wind-up roll and said first DC motor being connected to each other through first speed reduction means with a predetermined reduction ratio, said reduction ratio depending on a gradient which is decided based on a relationship between a torque and a rotational speed of said first DC motor by the respective rotation speed and torques computed from the feed speed and tension of said ink sheet when said wind-up roll has a maximum diameter, which is constituted by the wind-up roll being fully wound with the ink sheet while the feed roll is free of being wound with the ink sheet, and when said wind-up roll has a minimum diameter, which is constituted by said wind-up roll being free of being wound by the ink sheet while the feed roll is fully wound with the ink sheet, said predetermined voltage being based on the relationship between the torque and the rotational speed of said first DC motor by respective rotational speed and torques computed from the feed speed and tension of said ink sheet when said wind-up roll is of the maximum diameter and when the said wind-up roll is of the minimum diameter.

3. A method for driving a thermal transfer recording apparatus which is provided with a base, a platen roller rotatably driven, and a thermal head disposed movable toward and away from and opposite to said platen roller, between said platen roller and said thermal head in press-contact therewith are inserted an ink sheet and a recording paper superposed therewith so that said platen roller is rotatably driven while transferring ink of said ink sheet onto said recording paper, said method comprising the steps of;

setting a feed speed for said ink sheet delivered from said platen roller when said ink is transferred and tension applied to said ink sheet when said ink sheet is wound up by a wind-up roll;

computing the respective rotation speed and torques of said wind-up roll from said feed speed and tension when said wind-up roll is of the minimum diameter and the maximum diameter;

deciding a desired gradient in a chart of the relationship between the torque and the rotation speed of a DC motor by said computed rotation speed and torque, said DC motor being connected through speed reduction means to said windup roll for winding up said ink sheet thereon;

deciding a reduction ratio of said speed reduction means corresponding to said gradient; and controlling the driving voltage for said DC motor.

4. A thermal transfer recording apparatus which is provided with a base, a platen roller rotatably driven, and a thermal head movable toward and away from and opposite to said platen roller so that between said platen roller and said thermal head in press-contact therewith are inserted an ink sheet and a recording paper superposed with each other, said platen roller being rotatably driven while transferring ink of said ink sheet on said recording paper, said thermal transfer recording apparatus comprising:

a feed roll disposed at the one side of the rotating direction of said platen roller for feeding said ink sheet;

a wind-up roll disposed at the other side of said platen roller for winding up said ink sheet;

a first DC motor connected to said wind-up roll so as to rotatably drive said wind-up roll;

motor driving means for applying a predetermined voltage to said first DC motor when said ink is transferred; and tension applying means provided at said feed roll, for applying a predetermined tension to said ink sheet when said ink sheet is fed, said wind-up roll and first DC motor being connected to each other through first speed reduction means with a predetermined reduction ratio, said reduction ratio depending on a gradient which is decided based on a relationship between a torque and a rotational speed of said first DC motor by the respective rotation speed and torques computed from feed speed and tension of said ink sheet when said wind-up roll has a maximum diameter, which is constituted by the wind-up roll being fully wound with the ink sheet while the feed roll is free of being wound by the ink sheet, and when said wind-up roll has a minimum diameter, which is constituted by said wind-up roll being free of being wound by the ink sheet while the feed roll is fully wound with the ink sheet, said tension applying means comprising holding means which supports said ink sheet roll and a torque limiter which is interposed between said holding means and said base and limits torque of said holding means.

5. A thermal transfer recording apparatus which is provided with a base, a platen roller rotatably driven, and a thermal head movable toward and away from and opposite to said platen roller so that between said platen roller and said thermal head in press-contact therewith are inserted an ink sheet and a recording paper superposed with each other, said platen roller being rotatably driven while transferring ink of said ink sheet on said recording paper, said thermal transfer recording apparatus comprising:

a feed roll disposed at the one side of the rotating direction of said platen roller for feeding said ink sheet;

a wind-up roll disposed at the other side of said platen roller for winding up said ink sheet;

a first DC motor connected to said wind-up roll so as to rotatably drive said wind-up roll;

motor driving means for applying a predetermined voltage to said first DC motor when said ink is transferred; and tension applying means provided at said ink sheet roll, for applying a predetermined tension to said feed when said ink sheet is fed, said tension applying means comprising a second DC motor connected to said feed roll for applying tension to said ink sheet by a static torque generated in a state where said second DC motor is cut off from a power source, said feed roll and second DC motor being connected with each other through a second speed reduction means having the same reduction ratio as the reduction ratio of said first speed reduction means, said tension applying means including means for applying a predetermined voltage to said second DC motor so as to wind up said ink sheet onto said feed roll, said predetermined voltage being based on a relationship between the torque and a rotational speed of said second DC motor by respective rotational speed and torques computed from a feed speed and tension of said feed roll when said feed roll has a maximum diameter, which is constituted by the feed roll being fully wound with the ink sheet while the wind-up roll is free of being wound by the ink sheet, and when said feed roll has a minimum diameter, which is constituted by the feed roll being free of being wound with the ink sheet while the wind-up roll is fully wound with the ink sheet.

6. A thermal transfer recording apparatus which is provided with a base, a platen roller rotatably driven, and a thermal head movable toward and away from and opposite to said platen roller so that between said platen roller and said thermal head in press-contact therewith are inserted in ink sheet and a recording paper superposed with each other, said platen roller being rotatably driven while transferring ink of said ink sheet on said recording paper, said thermal transfer recording apparatus comprising:

a feed roll disposed at the one side of the rotating direction of said plate roller for feeding said ink sheet;

a wind-up roll disposed at the other side of said platen roller for winding up said ink sheet;

a first DC motor connected to said wind-up roll so as to rotatably drive said wind-up roll;

motor driving control means for driving said first DC motor so that said wind-up roll winds up said ink sheet at a constant wind-up speed while applying a predetermined tension to said ink sheet regardless of a roll diameter of said wind-up roll when said ink is transferred, the roll diameter being dependent upon an amount of the ink sheet wound on said wind-up roller; and tension applying means provided at said ink sheet roll for applying a predetermined tension to said ink sheet when said ink sheet is fed. tension of said ink sheet roll when said ink sheet roll is of the maximum diameter and the minimum diameter.

7. A thermal transfer recording apparatus as set forth in claim 4, wherein said first DC motor, when said ink sheet is wound up without ink transfer, is driven at a higher voltage than that at transferring ink and makes said wind-up roll rotate at a faster speed than that at transferring ink.

8. A thermal transfer recording apparatus as set forth in claim 5, wherein said first and second DC motors, when said ink sheet is wound up without ink transfer, are driven respectively so as to rotate said wind-up roll and ink sheet roll in the same direction and at a faster speed than that at transferring ink.

9. A thermal transfer recording apparatus as set forth in claim 5, wherein said first and second DC motors, when said ink sheet is wound up without ink transfer, are driven respectively and at a higher voltage than that at transferring ink so as to rotate said wind-up roll and ink sheet roll in the same direction and at a faster speed than that at transferring ink.

* * * * *

UNITED STATES PATENT AND TRADEMARK OFFICE
CERTIFICATE OF CORRECTION

PATENT NO. : 4,973,985

DATED : November 27, 1990

INVENTOR(S) : Hirokazu Genno, et al.

It is certified that error appears in the above-identified patent and that said Letters Patent is hereby corrected as shown below:

Col. 10 line 43, after "." cancel "tension of said ink";

Col. 10 lines 44 and 45, cancel in their entireties.

Signed and Sealed this

Second Day of June, 1992

*Attest:*

DOUGLAS B. COMER

*Attesting Officer* *Acting Commissioner of Patents and Trademarks*